United States Patent
Hanrahan

(10) Patent No.: US 12,092,040 B2
(45) Date of Patent: Sep. 17, 2024

(54) SELECTIVE POWER DISTRIBUTION FOR AN AIRCRAFT PROPULSION SYSTEM

(71) Applicant: Raytheon Technologies Corporation, Farmington, CT (US)

(72) Inventor: Paul R. Hanrahan, Sedona, AZ (US)

(73) Assignee: RTX Corporation, Farmington, CT (US)

(*) Notice: Subject to any disclaimer, the term of this patent is extended or adjusted under 35 U.S.C. 154(b) by 0 days.

(21) Appl. No.: 18/202,727

(22) Filed: May 26, 2023

(65) Prior Publication Data
US 2023/0383700 A1    Nov. 30, 2023

Related U.S. Application Data

(60) Provisional application No. 63/346,165, filed on May 26, 2022.

(51) Int. Cl.
| | | |
|---|---|---|
| *F02C 7/36* | (2006.01) | |
| *B64C 27/32* | (2006.01) | |
| *B64D 27/10* | (2006.01) | |
| *B64D 35/00* | (2006.01) | |

(52) U.S. Cl.
CPC .............. *F02C 7/36* (2013.01); *B64C 27/32* (2013.01); *B64D 27/10* (2013.01); *B64D 35/00* (2013.01); *F05D 2260/40311* (2013.01); *F05D 2260/90* (2013.01)

(58) Field of Classification Search
CPC .. F02C 7/36; F02C 6/206; F02C 3/107; F02C 7/06; F02C 7/32; F05D 2260/40311; F05D 2260/90; F05D 2220/323; F16H 1/28; F16H 57/08; B64D 27/10; B64D 35/00; B64C 27/32
See application file for complete search history.

(56) References Cited

U.S. PATENT DOCUMENTS

| | | | |
|---|---|---|---|
| 4,651,521 | A | 3/1987 | Ossi |
| 4,791,783 | A | 12/1988 | Neitzel |
| 5,209,428 | A | 5/1993 | Bevilaqua |
| 5,452,988 | A | 9/1995 | Short |
| 6,269,627 | B1 | 8/2001 | Freese |
| 6,270,037 | B1 | 8/2001 | Freese |
| 7,481,062 | B2 | 1/2009 | Gaines |

(Continued)

OTHER PUBLICATIONS

EP Search Report for EP Patent Application No. 23175706.3 dated Sep. 25, 2023.

*Primary Examiner* — Craig Kim
(74) *Attorney, Agent, or Firm* — Getz Balich LLC

(57) ABSTRACT

An assembly is provided for an aircraft propulsion system. This assembly includes a sun gear, a ring gear, a plurality of intermediate gears, a carrier, a first brake and a second brake. The sun gear is rotatable about a centerline axis. The ring gear circumscribes the sun gear and is rotatable about the centerline axis. The intermediate gears are arranged circumferentially about the centerline axis. Each of the intermediate gears is meshed between the sun gear and the ring gear. The carrier is rotatable about the centerline axis. Each of the intermediate gears is rotatably mounted to the carrier. The first brake is configured to slow and/or stop rotation of the ring gear about the centerline axis. The second brake is configured to slow and/or stop rotation of the carrier about the centerline axis.

15 Claims, 6 Drawing Sheets

(56) References Cited

U.S. PATENT DOCUMENTS

| | | | | |
|---|---|---|---|---|
| 11,745,888 B2* | 9/2023 | Harvey | ................ | B64D 35/08 |
| | | | | 244/53 R |
| 11,815,145 B2* | 11/2023 | Huschenhoefer | ....... | F16D 66/00 |
| 2014/0364265 A1* | 12/2014 | Bentgen | ................ | B63H 23/06 |
| | | | | 475/332 |
| 2018/0135512 A1* | 5/2018 | Poulin | .................... | F02C 3/113 |
| 2020/0017229 A1 | 1/2020 | Steinert | | |
| 2020/0070990 A1* | 3/2020 | Harvey | ................ | B64D 27/00 |
| 2020/0307812 A1 | 10/2020 | Dubreuil | | |
| 2020/0307818 A1* | 10/2020 | Dubreuil | ............... | B64D 27/24 |
| 2020/0354068 A1* | 11/2020 | Razak | .................... | F02C 6/003 |
| 2021/0179286 A1* | 6/2021 | Harvey | ................. | F01D 15/10 |

* cited by examiner

SELECTIVE POWER DISTRIBUTION FOR AN AIRCRAFT PROPULSION SYSTEM

This application claims priority to U.S. Patent Appln. No. 63/346,165 filed May 26, 2022, which is hereby incorporated herein by reference in its entirety.

BACKGROUND OF THE DISCLOSURE

1. Technical Field

This disclosure relates generally to an aircraft propulsion system and, more particularly, to power distribution between different rotors of the aircraft propulsion system.

2. Background Information

Various types and configurations of propulsion systems are known in the art for an aircraft. While these known aircraft propulsion systems have various benefits, there is still room in the art for improvement.

SUMMARY OF THE DISCLOSURE

According to an aspect of the present disclosure, an assembly is provided for an aircraft propulsion system. This assembly includes a sun gear, a ring gear, a plurality of intermediate gears, a carrier, a first brake and a second brake. The sun gear is rotatable about a centerline axis. The ring gear circumscribes the sun gear and is rotatable about the centerline axis. The intermediate gears are arranged circumferentially about the centerline axis. Each of the intermediate gears is meshed between the sun gear and the ring gear. The carrier is rotatable about the centerline axis. Each of the intermediate gears is rotatably mounted to the carrier. The first brake is configured to slow and/or stop rotation of the ring gear about the centerline axis. The second brake is configured to slow and/or stop rotation of the carrier about the centerline axis.

According to another aspect of the present disclosure, another assembly is provided for an aircraft propulsion system. This assembly includes a powertrain, and the powertrain includes an epicyclic geartrain, an input, a first output and a second output. The epicyclic geartrain is operable in a star system mode and a planetary system mode. The epicyclic geartrain is configured to transfer power from the input to the first output during the star system mode. The epicyclic geartrain is configured to transfer power from the input to the second output during the planetary system mode.

According to still another aspect of the present disclosure, another assembly is provided for an aircraft propulsion system. This assembly includes a gas turbine engine core, a first propulsor rotor, a second propulsor rotor, a powertrain, a first brake and a second brake. The gas turbine engine core includes a compressor section, a combustor section, a turbine section and a rotating structure. The rotating structure includes a turbine rotor within the turbine section. The powertrain is configured to transfer power from the rotating structure to the first propulsor rotor during a first mode. The powertrain is configured to transfer power from the rotating structure to the second propulsor rotor during a second mode. The first brake is engaged during the second mode and disengaged during the first mode. The second brake is engaged during the first mode and disengaged during the second mode.

The epicyclic geartrain may not transfer power from the input to the second output during the star system mode. The epicyclic geartrain may also or alternatively not transfer power from the input to the first output during the planetary system mode.

The epicyclic geartrain may include a sun gear, a ring gear, a plurality of intermediate gears and a carrier. The sun gear may be rotatable about a centerline axis. The sun gear may be coupled to the input. The ring gear may circumscribe the sun gear and may be rotatable about the centerline axis. The ring gear may be coupled to the first output. The intermediate gears may be arranged circumferentially about the centerline axis. Each of the intermediate gears may be meshed between the sun gear and the ring gear. The carrier may be rotatable about the centerline axis. Each of the intermediate gears may be rotatably mounted to the carrier. The carrier may be coupled to the second output.

The assembly may also include a first brake and a second brake. The first brake may be configured to stop rotation of the first output during the planetary system mode. The second brake may be configured to stop rotation of the second output during the star system mode.

During a star system mode: the second brake may be configured to stop rotation of the carrier about the centerline axis; the sun gear may be configured to rotate about the centerline axis; and the ring gear may be configured to rotate about the centerline axis.

The first brake may be disengaged during the star system mode.

During a planetary system mode: the first brake may be configured to stop rotation of the ring gear about the centerline axis; the sun gear may be configured to rotate about the centerline axis; and the carrier may be configured to rotate about the centerline axis.

The second brake may be disengaged during the planetary system mode.

During an open system mode: the first brake and the second brake may be disengaged; the sun gear may be configured to rotate about the centerline axis; the ring gear may be configured to rotate about the centerline axis; and the carrier may be configured to rotate about the centerline axis.

The assembly may also include a gas turbine engine core. The gas turbine engine core may include a compressor section, a combustor section, a turbine section and a rotating structure. The rotating structure may include a turbine rotor within the turbine section. The rotating structure may be coupled to and configured to rotatably drive the sun gear about the centerline axis.

The assembly may also include a first propulsor rotor and a second propulsor rotor. The first propulsor rotor may be coupled to and configured to be rotatably driven by the ring gear. The second propulsor rotor may be coupled to and configured to be rotatably driven by the carrier.

The first propulsor rotor may be rotatable about a first axis. The second propulsor rotor may be rotatable about a second axis that is angularly offset from the first axis.

The first propulsor rotor may be configured to generate propulsive force in a first direction. The second propulsor rotor may be configured to generate propulsive force in a second direction that is different than the first direction.

The gas turbine engine core may also include a second rotating structure. The second rotating structure may include a compressor rotor within the compressor section and a second turbine rotor within the turbine section.

The assembly may also include a propulsor rotor coupled to and configured to be rotatably driven by the ring gear.

The propulsor rotor may be configured as or otherwise include a ducted rotor.

The assembly may also include a propulsor rotor coupled to and configured to be rotatably driven by the carrier.

The propulsor rotor may be configured as or otherwise include an open rotor.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
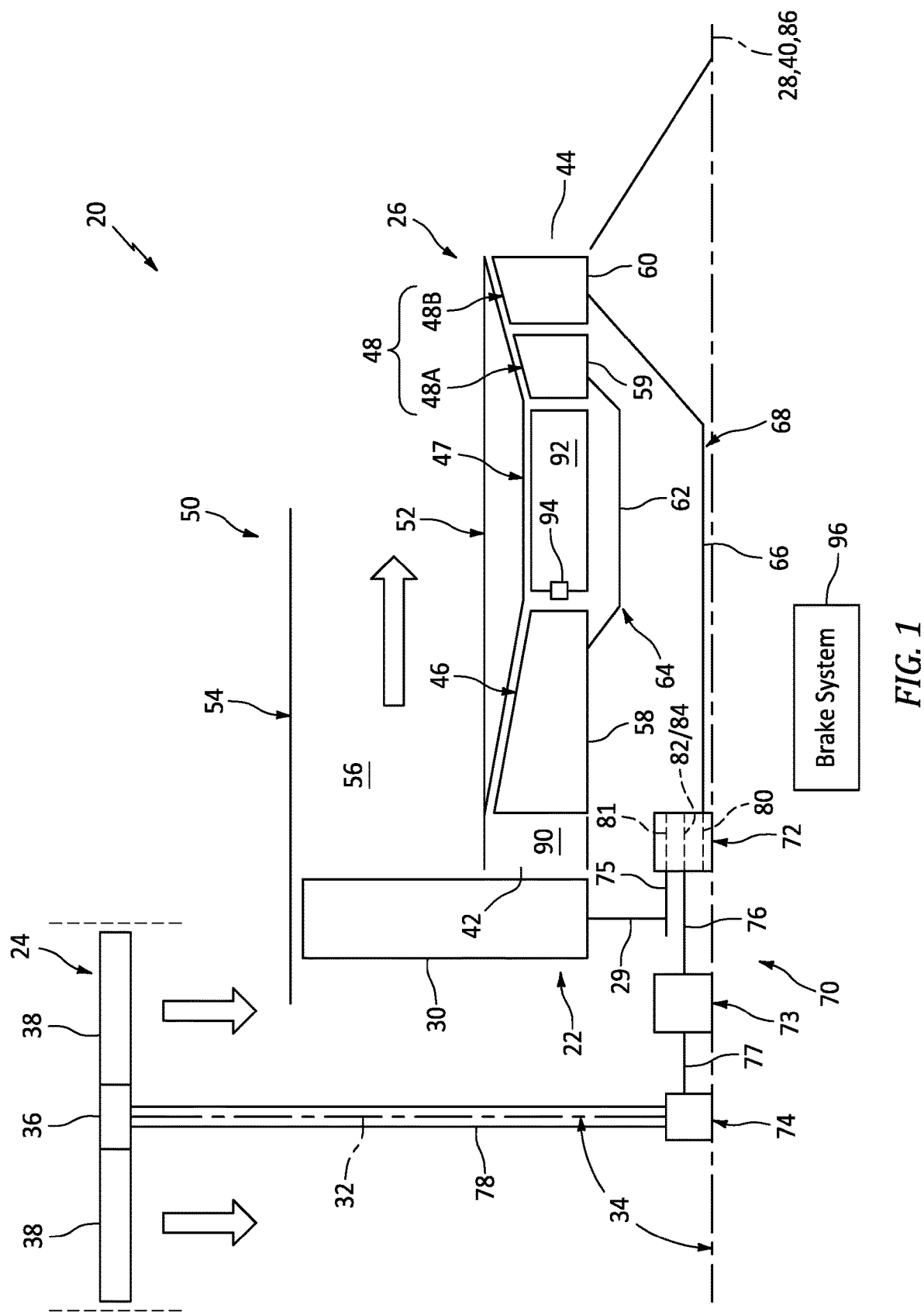
FIG. 1 is a partial, schematic illustration of an aircraft propulsion system.

FIG. 1 schematically illustrates a propulsion system 20 for an aircraft. The aircraft may be an airplane, a helicopter, a drone (e.g., an unmanned aerial vehicle (UAV)), a spacecraft or any other manned or unmanned aerial vehicle. This aircraft may be configured as a vertical take-off and landing (VTOL) aircraft or a short take-off and vertical landing (STOVL) aircraft. The aircraft propulsion system 20 of FIG. 1, for example, is configured to generate power for first direction propulsion (e.g., propulsive thrust) during a first mode of operation and to generate power for second direction propulsion (e.g., propulsive lift) during a second mode of operation, where the first direction is different than (e.g., angularly offset from) the second direction. The first mode may be a horizontal (e.g., forward) flight mode where the first direction propulsion is substantially horizontal (e.g., within 5 degrees, 10 degrees, etc. of a horizontal axis) propulsive thrust. The second mode may be a vertical flight and/or hover mode where the second direction propulsion is substantially vertical (e.g., within 5 degrees, 10 degrees, etc. of a vertical axis) propulsive lift. The aircraft propulsion system 20, of course, may also be configured to generate both the first direction (e.g., horizontal) propulsion and the second direction (e.g., vertical) propulsion during a third (e.g., transition) mode of operation. The aircraft propulsion system 20 of FIG. 1 includes at least one bladed first propulsor rotor 22, at least one bladed second propulsor rotor 24 and a gas turbine engine core 26 configured to rotatably drive the first propulsor rotor 22 and the second propulsor rotor 24.

The first propulsor rotor 22 may be configured as a ducted rotor such as a fan rotor. The first propulsor rotor 22 of FIG. 1 is rotatable about a first rotor axis 28. This first rotor axis 28 is an axial centerline of the first propulsor rotor 22 and may be horizontal when the aircraft is on ground. The first propulsor rotor 22 includes at least a first rotor disk 29 and a plurality of first rotor blades 30 (on visible in FIG. 1); e.g., fan blades. The first rotor blades 30 are distributed circumferentially around the first rotor disk 29 in an annular array. Each of the first rotor blades 30 is connected to and projects radially (relative to the first rotor axis 28) out from the first rotor disk 29.

The second propulsor rotor 24 may be configured as an open rotor such as a propeller rotor or a helicopter (e.g., main) rotor. Of course, in other embodiments, the second propulsor rotor 24 may alternatively be configured as a ducted rotor such as a fan rotor; e.g., see dashed line duct. The second propulsor rotor 24 of FIG. 1 is rotatable about a second rotor axis 32. This second rotor axis 32 is an axial centerline of the second propulsor rotor 24 and may be vertical when the aircraft is on the ground. The second rotor axis 32 is angularly offset from the first rotor axis 28 by an included angle 34; e.g., an acute angle or a right angle. This included angle 34 may be between sixty degrees (60°) and ninety degrees (90°); however, the present disclosure is not limited to such an exemplary relationship. The second propulsor rotor 24 includes at least a second rotor disk 36 and a plurality of second rotor blades 38; e.g., open rotor blades. The second rotor blades 38 are distributed circumferentially around the second rotor disk 36 in an annular array. Each of the second rotor blades 38 is connected to and projects radially (relative to the second rotor axis 32) out from the second rotor disk 36.

The engine core 26 extends axially along a core axis 40 between a forward, upstream airflow inlet 42 and an aft, downstream exhaust 44. The core axis 40 may be an axial centerline of the engine core 26 and may be horizontal when the aircraft is on the ground. This core axis 40 may be parallel (e.g., coaxial) with the first rotor axis 28 and, thus, angularly offset from the second rotor axis 32. The engine core 26 of FIG. 1 includes a compressor section 46, a combustor section 47 and a turbine section 48. The turbine section 48 of FIG. 1 includes a high pressure turbine (HPT) section 48A and a low pressure turbine (LPT) section 48B (also sometimes referred to as a power turbine section).

The engine sections 46-48B are arranged sequentially along the core axis 40 within an engine housing 50. This engine housing 50 includes an inner case 52 (e.g., a core case) and an outer case 54 (e.g., a fan case). The inner case 52 may house one or more of the engine sections 46-48B; e.g., the engine core 26. The outer case 54 may house the first propulsor rotor 22. The outer case 54 of FIG. 1 also axially overlaps and extends circumferentially about (e.g., completely around) the inner case 52 thereby at least partially forming a bypass flowpath 56 radially between the inner case 52 and the outer case 54.

Each of the engine sections 46, 48A and 48B includes a bladed rotor 58-60 within that respective engine section 46, 48A, 48B. Each of these bladed rotors 58-60 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The compressor rotor 58 is connected to the HPT rotor 59 through a high speed shaft 62. At least (or only) these engine components 58, 59 and 62 collectively form a high speed rotating structure 64. This high speed rotating structure 64 is rotatable about the core axis 40. The LPT rotor 60 is connected to a low speed shaft 66. At least (or only) these engine components collectively form a low speed rotating structure 68. This low speed rotating structure 68 is rotatable about the core axis 40. The low speed rotating structure 68 and, more particularly, its low speed shaft 66 may project axially through a bore of the high speed rotating structure 64 and its high speed shaft 62.

The aircraft propulsion system 20 of FIG. 1 includes a powertrain 70 that couples the low speed rotating structure 68 to the first propulsor rotor 22 and that couples the low speed rotating structure 68 to the second propulsor rotor 24. The powertrain 70 of FIG. 1 includes a geartrain 72, a transmission 73 and a gear system 74; e.g., bevel gearing. The powertrain 70 of FIG. 1 also includes one or more shafts 75-78 and/or other torque transmission devices.

Figure 2A:
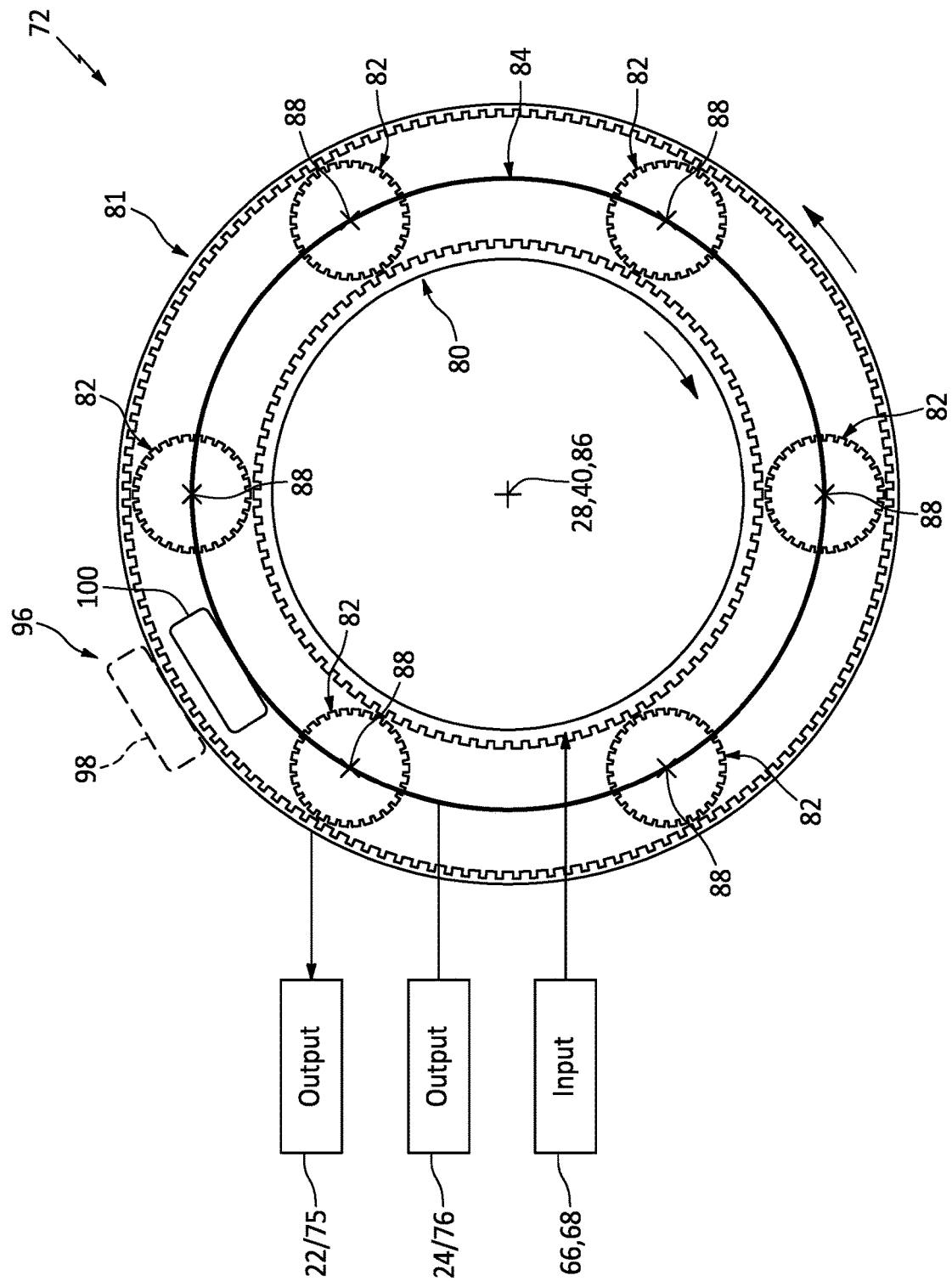
FIG. 2A is a schematic illustration of a geartrain coupled between an input and multiple outputs, where the geartrain is depicted operating in a star system mode.
Figure 2B:
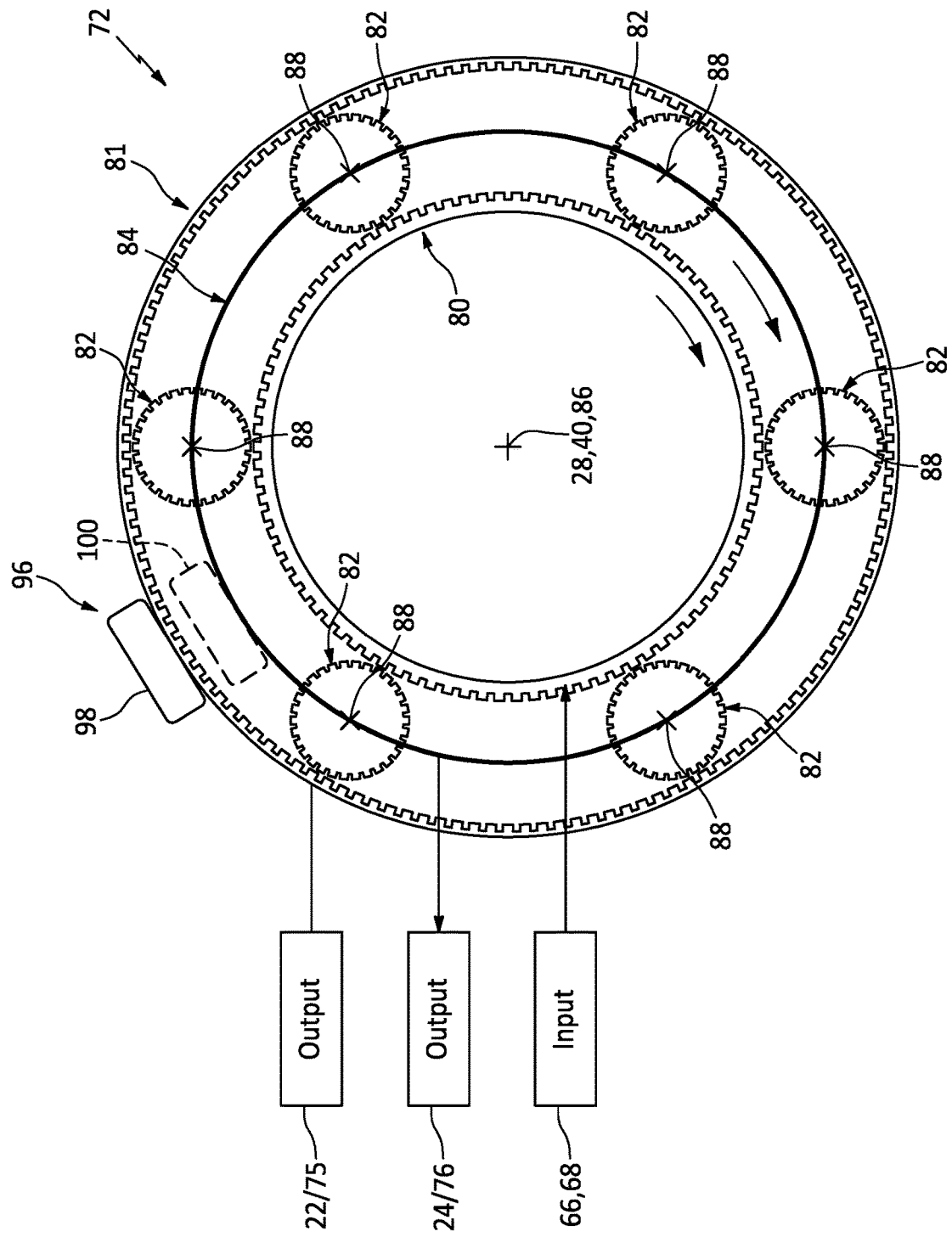
FIG. 2B is a schematic illustration of the geartrain coupled between the input and the outputs, where the geartrain is depicted operating in a planetary system mode.
Figure 2C:
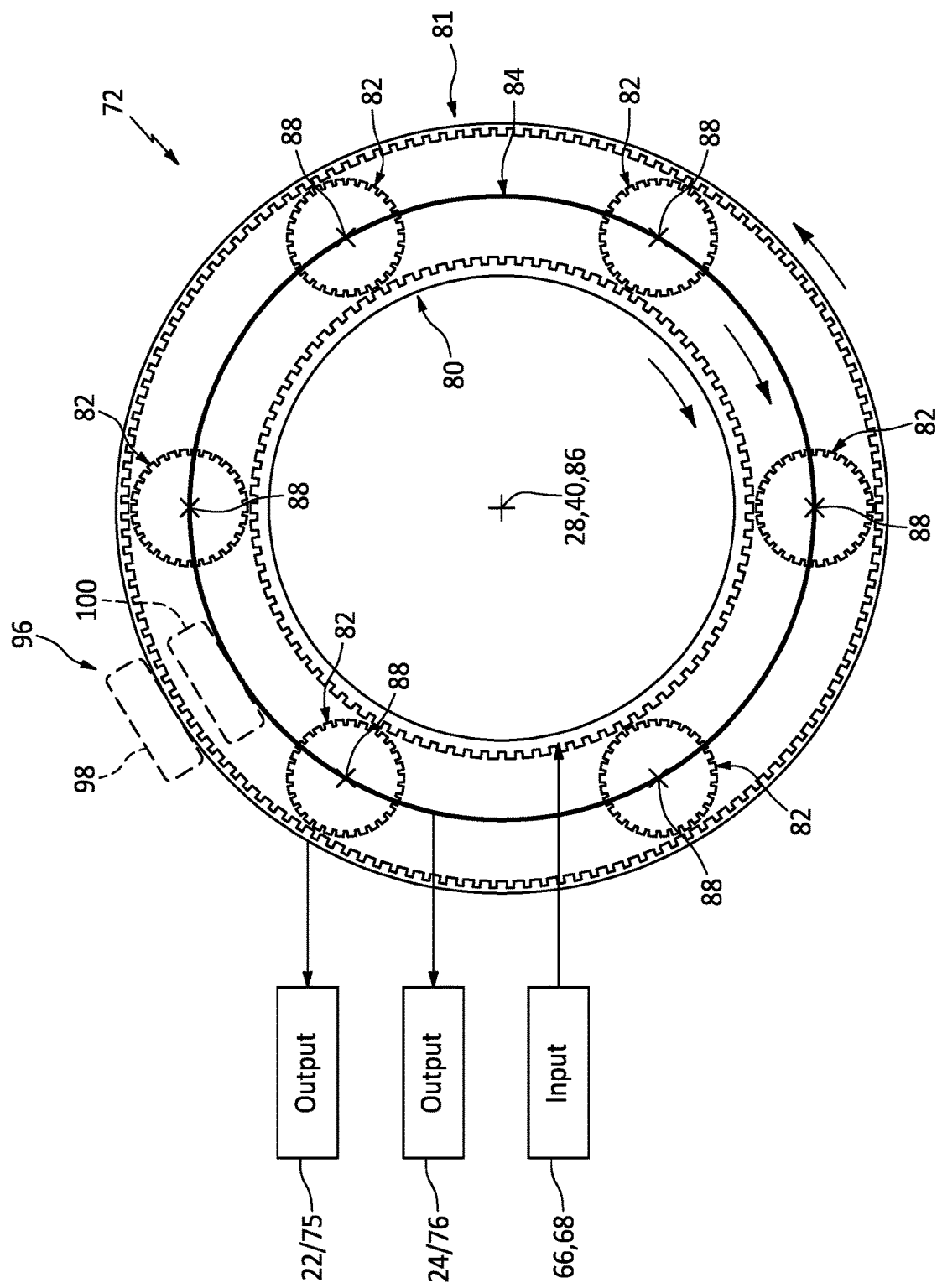
FIG. 2C is a schematic illustration of the geartrain coupled between the input and the outputs, where the geartrain is depicted operating in an open system mode.

Referring to FIGS. 2A-C, the geartrain 72 may be configured as an epicyclic geartrain. This geartrain 72 may be operable as a star geartrain during a star system mode of operation; e.g., see FIG. 2A. The geartrain 72 may be operable as a planetary geartrain during a planetary system mode of operation; e.g., see FIG. 2B. The geartrain 72 may also be operable as an open epicyclic geartrain during an open mode of operation; e.g., see FIG. 2C.

The geartrain 72 of FIGS. 2A-C includes an inner sun gear 80, an outer ring gear 81, one or more intermediate gears 82 (e.g., planet or star gears) and a carrier 84. The sun gear 80 is rotatable about a centerline axis 86 of the geartrain 72, which centerline axis 86 may be parallel (e.g., coaxial) with the axis 28, 40. The ring gear 81 is rotatable about the centerline axis 86 during at least (or only) the star system mode of operation. This ring gear 81 extends circumferentially around (e.g., circumscribes) the sun gear 80 and an annular array of the intermediate gears 82. The intermediate gears 82 are arranged circumferentially about the centerline axis 86 in the annular array. Each of the intermediate gears 82 is radially between and meshed with the sun gear 80 and the ring gear 81. Each of the intermediate gears 82 is rotatable about a respective intermediate gear axis 88, and is rotatably mounted to and supported by the carrier 84. The carrier 84 is rotatable about the centerline axis 86 during at least (or only) the planetary system mode of operation.

Referring to FIG. 1, the sun gear 80 is coupled to the low speed rotating structure 68 and its low speed shaft 66, where the low speed shaft 66 provides a power input for the geartrain 72. The ring gear 81 is coupled to the first propulsor rotor 22 through the first propulsor shaft 75, where the first propulsor shaft 75 provides a first power output from the geartrain 72. The carrier 84 and, thus, the intermediate gears 82 are coupled to the second propulsor rotor 24 through the system elements 76, 73, 77, 74 and 78, where the geartrain output shaft 76 provides a second power output from the geartrain 72. More particularly, the carrier 84 is coupled to the transmission 73 through the geartrain output shaft 76.

An output of the transmission 73 is connected to the gear system 74 through the transmission output shaft 77. This transmission 73 may be configured to selectively couple (e.g., transfer mechanical power between) the geartrain output shaft 76 and the transmission output shaft 77. During the first mode of operation, for example, the transmission 73 may be configured to decouple the geartrain output shaft 76 from the transmission output shaft 77, thereby decoupling the low speed rotating structure 68 form the second propulsor rotor 24. During the second mode of operation (and the third mode of operation), the transmission 73 may be configured to couple the geartrain output shaft 76 with the transmission output shaft 77, thereby coupling the low speed rotating structure 68 with the second propulsor rotor 24. The transmission 73 may be configured as a clutchless transmission.

An output of the gear system 74 is connected to the second propulsor rotor 24 through the second propulsor shaft 78. This gear system 74 provides a coupling between the transmission output shaft 77 rotating about the axis 28, 40, 86 and the second propulsor shaft 78 rotating about the second rotor axis 32. The gear system 74 may also provide a speed change mechanism between the transmission output shaft 77 and the second propulsor shaft 78. The gear system 74, however, may alternatively provide a 1:1 rotational coupling between the transmission output shaft 77 and the second propulsor shaft 78 such that these shafts 77 and 78 rotate at a common (e.g., the same) speed. Furthermore, in some embodiments, the gear system 74 and the shaft 77 may be omitted where the functionality of the gear system 74 is integrated into the transmission 73. In still other embodiments, the transmission 73 may be omitted where decoupling of the second propulsor rotor 24 is not required.

During operation of the aircraft propulsion system 20, air enters the engine core 26 through the airflow inlet 42. This air is directed into a core flowpath 90 which extends sequentially through the compressor section 46, the combustor section 47, the HPT section 48A and the LPT section 48B to the exhaust 44. The air within this core flowpath 90 may be referred to as core air.

The core air is compressed by the compressor rotor 58 and directed into a (e.g., annular) combustion chamber 92 of a (e.g., annular) combustor in the combustor section 47. Fuel is injected into the combustion chamber 92 through one or more fuel injectors 94 (one visible in FIG. 1) and mixed with the compressed core air to provide a fuel-air mixture. This fuel-air mixture is ignited and combustion products thereof flow through and sequentially cause the HPT rotor 59 and the LPT rotor 60 to rotate. The rotation of the HPT rotor 59 drives rotation of the high speed rotating structure 64 and its compressor rotor 58. The rotation of the LPT rotor 60 drives rotation of the low speed rotating structure 68. The rotation of the low speed rotating structure 68 drives rotation of the first propulsor rotor 22 through the system components 72, 75 and 81 during a select mode or modes of operation; e.g., the first and the third modes of operation. The rotation of the low speed rotating structure 68 drives rotation of the second propulsor rotor 24 through the system components 72, 82, 84, 76, 73, 77, 74 and 78 during a select mode or modes of operation; e.g., the second and the third modes of operation. However, during the first mode of operation, the transmission 73 may decouple the low speed rotating structure 68 from the second propulsor rotor 24 such that the low speed rotating structure 68 does not drive rotation of the second propulsor rotor 24. The second propulsor rotor 24 may thereby be stationary (or windmill) during the first mode of operation.

During the first and third modes of operation, the rotation of the first propulsor rotor 22 propels bypass air (separate from the core air) through the aircraft propulsion system 20 and its bypass flowpath 56 to provide the first direction propulsion; e.g., the forward, horizontal thrust. During the second and third modes of operation, the rotation of the second propulsor rotor 24 propels additional air (separate from the core air and the bypass air) to provide the second direction propulsion; e.g., vertical lift. The aircraft may thereby takeoff, land and/or otherwise hover during the second and third modes of operation, and the aircraft may fly forward or otherwise move during the first and the third modes of operation.

During each mode of operation, the low speed rotating structure 68 is coupled to the first propulsor rotor 22 through the geartrain 72. As described above, rotation of the first propulsor rotor 22 generates horizontal thrust during the first and the third modes of operation to propel the aircraft horizontally forward. However, generating such horizontal thrust (or significant amounts of horizontal thrust) may hinder and/or be less advantageous to certain aircraft takeoff, landing and/or hovering operations during the second mode of operation. Furthermore, producing horizontal thrust with the first propulsor rotor 22 during the second mode of operation may also use up engine core power that could otherwise be provided to the second propulsor rotor 24 for vertical aircraft lift. The aircraft propulsion system 20 of FIG. 1 is therefore configured with a brake system 96 (see also FIGS. 2A-C) operable to (A) slow and/or stop the rotation of the first propulsor rotor 22 during the second and/or the third modes of operation, and (B) slow and/or stop the rotation of the second propulsor rotor 24 during the first and/or the third modes of operation. This brake system 96 may also provide a clutch functionality for the transmission 73.

Referring to FIGS. 2A-C, the brake system 96 includes a first brake 98 and a second brake 100. The first brake 98 is associated with the ring gear 81 and, thus, the first propulsor rotor 22 (see FIG. 1). The second brake 100 is associated with the carrier 84 and, thus, the second propulsor rotor 24 (see FIG. 1).

The first brake 98 is configured to selectively engage and brake (e.g., stop or slow) rotation of the ring gear 81 and, thus, the system elements 22 and 75 coupled to and driven by the ring gear 81. For example, referring to FIG. 2A, the first brake 98 may (e.g., completely) disengage during the first mode of operation. With the first brake 98 is disengaged, the ring gear 81 and the associated system elements 22 and 75 may (e.g., freely) rotate. The brake system 96 and its first brake 98 may thereby facilitate (e.g., free) first propulsor rotor rotation during the first mode of operation. Referring to FIG. 2B, the first brake 98 may (e.g., completely) engage during the second mode of operation. With the first brake 98 engaged, the first brake 98 stops the rotation of the ring gear 81 and the associated system elements 22 and 75. The brake system 96 and its first brake 98 may thereby prevent first propulsor rotor rotation during the second mode of operation. Referring to FIG. 2C, during the third mode of operation, the first brake 98 may partially engage to slow the rotation of the ring gear 81 and the associated system elements 22 and 75. Alternatively, the first brake 98 may (e.g., completely) disengage during the third mode of operation.

The first brake 98 of FIGS. 2A-C is arranged with the ring gear 81. However, the first brake 98 may alternatively be arranged with any other system element coupled to and driven by the ring gear 81; e.g., the first propulsor shaft 75 or the first propulsor rotor 22 of FIG. 1.

The second brake 100 is configured to selectively engage and brake (e.g., stop or slow) rotation of the carrier 84 and, thus, the system elements 22, 73, 74 and 76-78 (see FIG. 1) coupled to and driven by the carrier 84. For example, referring to FIG. 2A, the second brake 100 may (e.g., completely) engage during the first mode of operation. With the second brake 100 engaged, the second brake 100 stops the rotation of the carrier 84 and the associated system elements 22, 73, 74 and 76-78 (see FIG. 1). The brake system 96 and its second brake 100 may thereby prevent second propulsor rotor rotation during the first mode of operation. Referring to FIG. 2B, the second brake 100 may (e.g., completely) disengage during the second mode of operation. With the second brake 100 disengaged, the carrier 84 and the associated system elements 22, 73, 74 and 76-78 (see FIG. 1) may (e.g., freely) rotate. The brake system 96 and its second brake 100 may thereby facilitate (e.g., free) second propulsor rotor rotation during the second mode of operation. Referring to FIG. 2C, during the third mode of operation, the second brake 100 may partially engage to slow the rotation of the carrier 84 and the associated system elements 22, 73, 74 and 76-78 (see FIG. 1). Alternatively, the second brake 100 may (e.g., completely) disengage during the third mode of operation.

The second brake 100 of FIGS. 2A-C is arranged with the carrier 84. However, the second brake 100 may alternatively be arranged with any other system element coupled to and driven by the carrier 84; e.g., the system element 73, 74, 76-78 of FIG. 1.

The first brake 98 and the second brake 100 are respectively used to initially stop/halt rotation of the ring gear 81 and the carrier 84. While these brakes 98 and 100 may be used to respectively hold/rotatably fix the ring gear 81 and the carrier 84, it is contemplated the ring gear 81 and/or the carrier 84 may also or alternatively be held/rotatably fixed (following the initial stopping) using one or more other devices. For example, a spline may be extended from an adjacent stationary part to selectively couple the member 81, 84 to the stationary part to prevent rotation of the respective the member 81, 84.

Referring to FIG. 2A, during the first mode of operation, the first brake 98 is disengaged and the second brake 100 is engaged. The ring gear 81 is therefore rotatable about the centerline axis 86, whereas the carrier 84 is stationary. With this arrangement, the geartrain 72 operates in its star system mode and is configured as the star geartrain. Referring to FIG. 2B, during the second mode of operation, the first brake 98 is engaged and the second brake 100 is disengaged. The ring gear 81 is therefore stationary, whereas the carrier 84 is rotatable about the centerline axis 86. With this arrangement, the geartrain 72 operates in its planetary system mode and is configured as the planetary geartrain. Referring to FIG. 2C, during the third mode of operation, the first brake 98 is partially engaged (or completely disengaged) and the second brake 100 is partially engaged (or completely disengaged). Both the ring gear 81 and the carrier 84 are therefore rotatable about the centerline axis 86—although in different rotational directions about the centerline axis 86. With this arrangement, the geartrain 72 operates in its open system mode and is configured as the open epicyclic geartrain where power is transferred from the low speed rotating structure 68 to both shafts 75 and 76. The aircraft propulsion system 20 may be operated in the third mode of operation while transitioning between the first and the second mode of operation.

During the star system mode of FIG. 2A, the geartrain 72 may transfer none of the power received from the low speed rotating structure 68 to the second propulsor rotor 24 since the carrier 84 is stationary. The geartrain 72 may therefore transfer (e.g., all, minus powertrain losses) power received from the low speed rotating structure 68 to the first propulsor rotor 22 to generate the first direction propulsive force; e.g., forward, horizontal thrust. By contrast, during the planetary system mode of FIG. 2B, the geartrain 72 may transfer none of the power received from the low speed rotating structure 68 to the first propulsor rotor 22 since the ring gear 81 is stationary. The geartrain 72 may therefore transfer (e.g., all, minus powertrain losses) power received from the low speed rotating structure 68 to the second propulsor rotor 24 to generate the second direction propulsive force; e.g., vertical lift. The brake system 96 of the present disclosure may thereby facilitate selective power distribution from the low speed rotating structure 68 to the first propulsor rotor 22 and the second propulsor rotor 24. Providing this selective power distribution may increase aircraft propulsion system efficiency and improve aircraft handling during at least the first and the second modes of operation.

Figure 3:
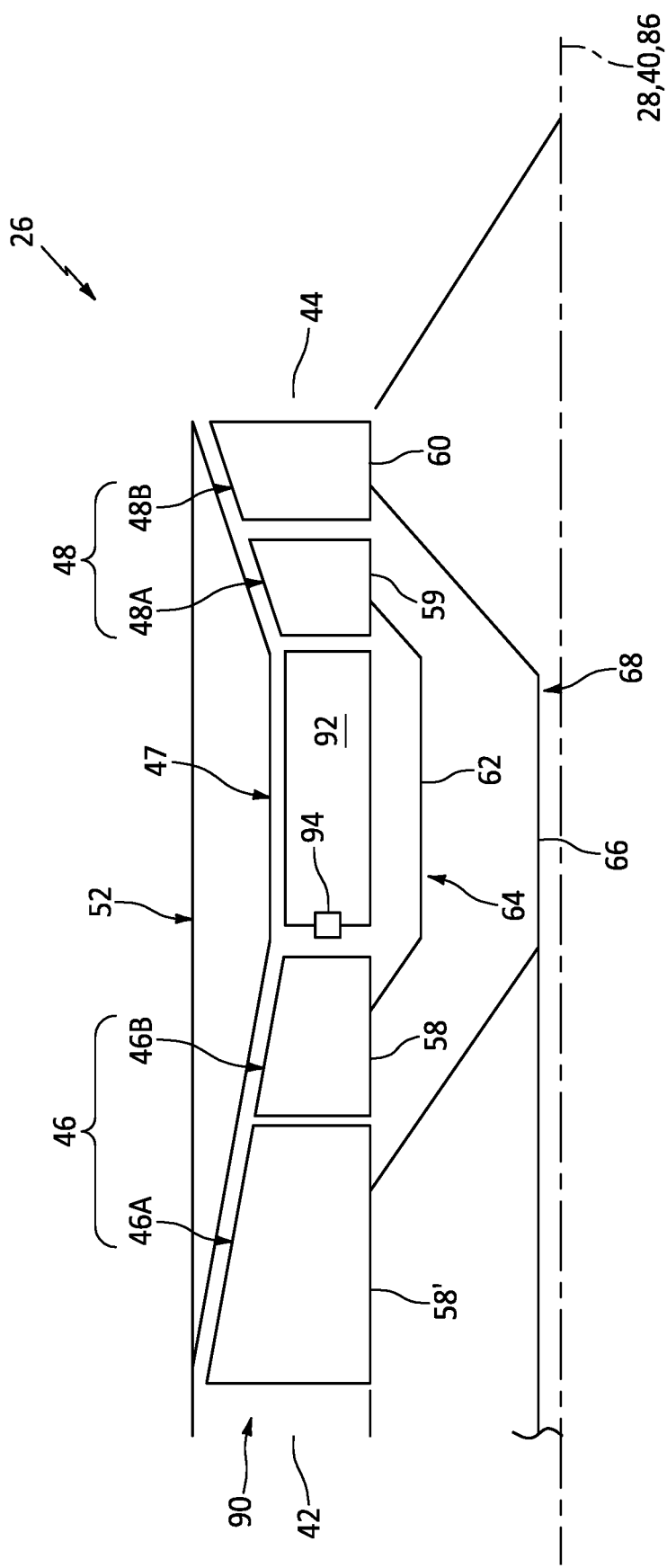
FIG. 3 is a partial schematic illustration of a gas turbine engine core with multi-staged compressor rotors.

In some embodiments, referring to FIG. 1, the low speed rotating structure 68 may be configured without a compressor rotor. In other embodiments, referring to FIG. 3, the low speed rotating structure 68 may include a low pressure compressor (LPC) rotor 58' arranged within a low pressure compressor (LPC) section 46A of the compressor section 46. In such embodiments, the compressor rotor 58 may be a high pressure compressor (HPC) rotor within a high pressure compressor (HPC) section 46B of the compressor section 46.

Figure 4:
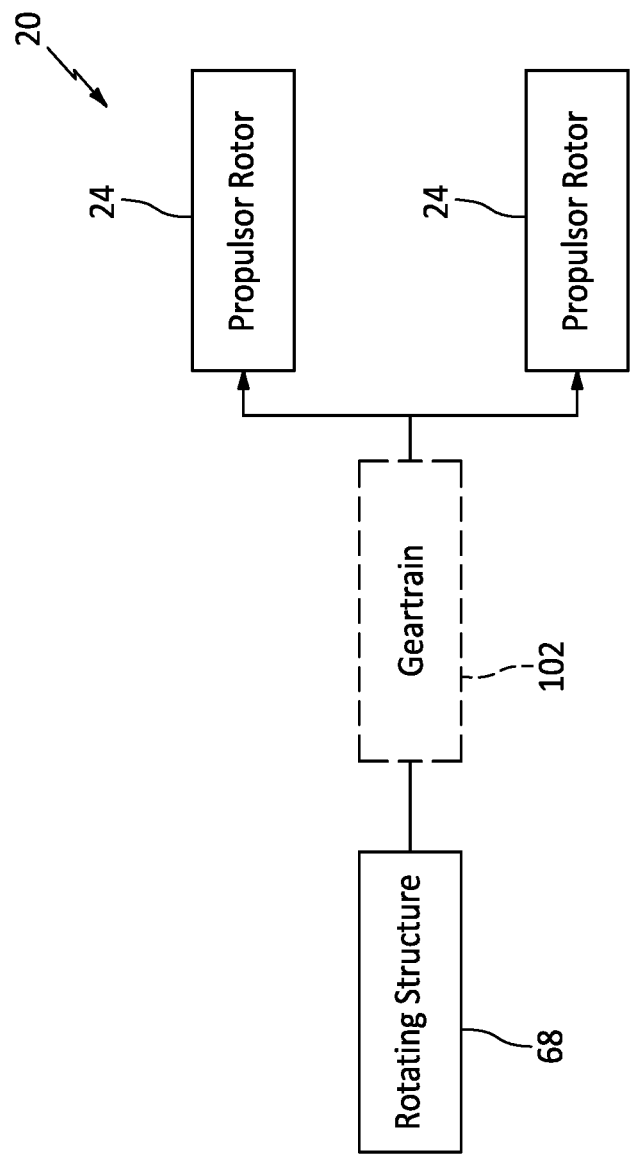
FIG. 4 is a partial schematic illustration of a rotating structure coupled to and driving multiple propulsor rotors for generating propulsive lift.

The engine core 26 may have various configurations other than those described above. The engine core 26, for example, may be configured with a single spool, with two spools (e.g., see FIG. 1), or with more than two spools. The engine core 26 may be configured with one or more axial flow compressor sections, one or more radial flow compressor sections, one or more axial flow turbine sections and/or one or more radial flow turbine sections. The engine core 26 may be configured with any type or configuration of annular, tubular (e.g., CAN), axial flow and/or reverser flow combustor. The present disclosure therefore is not limited to any particular types or configurations of gas turbine engine cores. Furthermore, it is contemplated the engine core 26 of the present disclosure may drive more than the two propulsors 22 and 24. The aircraft propulsion system 20, for example, may include two or more of the first propulsor rotors 22 and/or two or more of the second propulsor rotors 24. For example, the aircraft propulsion system 20 of FIG. 4 includes multiple second propulsor rotors 24 rotatably driven by the low speed rotating structure 68. These second propulsor rotors 24 may rotate about a common axis. Alternatively, each second propulsor rotor 24 may rotate about a discrete axis where, for example, the second propulsor rotors 24 are laterally spaced from one another and coupled to the low speed rotating structure 68 through a power splitting geartrain 102.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft propulsion system, comprising:
    a geartrain including a sun gear, a ring gear, a plurality of intermediate gears and a carrier, the sun gear rotatable about a centerline axis, the a ring gear circumscribing the sun gear and rotatable about the centerline axis, the plurality of intermediate gears arranged circumferentially about the centerline axis, each of the plurality of intermediate gears meshed between the sun gear and the ring gear, the carrier rotatable about the centerline axis, and each of the plurality of intermediate gears rotatably mounted to the carrier;
    a first brake configured to at least one of slow or stop rotation of the ring gear about the centerline axis;
    a second brake configured to at least one of slow or stop rotation of the carrier about the centerline axis;
    a first propulsor rotor coupled to the geartrain by the ring gear, the first propulsor rotor rotatable about a first axis;
    a second propulsor rotor coupled to the geartrain by the carrier, the second propulsor rotor rotatable about a second axis that is angularly offset from the first axis; and
    a gas turbine engine core including a compressor section, a combustor section, a turbine section and a rotating structure, the rotating structure comprising a turbine rotor within the turbine section, the rotating structure configured to drive rotation of the first propulsor rotor through the geartrain and using the ring gear, and the rotating structure configured to drive rotation of the second propulsor rotor through the geartrain and using the carrier.

2. The assembly of claim 1, wherein during a star system mode
    the second brake is configured to stop rotation of the carrier about the centerline axis;
    the sun gear is configured to rotate about the centerline axis; and
    the ring gear is configured to rotate about the centerline axis.

3. The assembly of claim 2, wherein the first brake is disengaged during the star system mode.

4. The assembly of claim 1, wherein during a planetary system mode
    the first brake is configured to stop rotation of the ring gear about the centerline axis;
    the sun gear is configured to rotate about the centerline axis; and
    the carrier is configured to rotate about the centerline axis.

5. The assembly of claim 4, wherein the second brake is disengaged during the planetary system mode.

6. The assembly of claim 1, wherein during an open system mode
    the first brake and the second brake are disengaged;
    the sun gear is configured to rotate about the centerline axis;
    the ring gear is configured to rotate about the centerline axis; and
    the carrier is configured to rotate about the centerline axis.

7. The assembly of claim 1, wherein
    the first propulsor rotor is configured to generate propulsive force in a first direction; and
    the second propulsor rotor is configured to generate propulsive force in a second direction that is different than the first direction.

8. The assembly of claim 1, wherein
    the gas turbine engine core further includes a second rotating structure; and
    the second rotating structure includes a compressor rotor within the compressor section and a second turbine rotor within the turbine section.

9. An assembly for an aircraft propulsion system, comprising:
    a geartrain including a sun gear, a ring gear, a plurality of intermediate gears and a carrier, the sun gear rotatable about a centerline axis, the a ring gear circumscribing the sun gear and rotatable about the centerline axis, the plurality of intermediate gears arranged circumferentially about the centerline axis, each of the plurality of intermediate gears meshed between the sun gear and the ring gear, the carrier rotatable about the centerline axis, and each of the plurality of intermediate gears rotatably mounted to the carrier;

a first brake configured to at least one of slow or stop rotation of the ring gear about the centerline axis;

a second brake configured to at least one of slow or stop rotation of the carrier about the centerline axis;

a propulsor rotor coupled to the geartrain by the ring gear; and a gas turbine engine core including a compressor section, a combustor section, a turbine section and a rotating structure, the rotating structure comprising a turbine rotor within the turbine section, the rotating structure configured to drive rotation of the propulsor rotor through the geartrain and using the ring gear.

10. The assembly of claim 9, wherein the propulsor rotor comprises a ducted rotor.

11. The assembly of claim 1, further comprising a propulsor rotor coupled to and configured to be rotatably driven by the carrier.

12. The assembly of claim 11, wherein the propulsor rotor comprises an open rotor.

13. An assembly for an aircraft propulsion system, comprising:

a powertrain comprising an epicyclic geartrain, an input, a first output and a second output;

the epicyclic geartrain operable as a star geartrain in a star system mode of operation, and the epicyclic geartrain operable as a planetary geartrain in a planetary system mode of operation;

the epicyclic geartrain configured to transfer power from the input to the first output during the star system mode of operation, wherein the epicyclic geartrain does not transfer power from the input to the second output during the star system mode of operation; and the epicyclic geartrain configured to transfer power from the input to the second output during the planetary system mode of operation, wherein the epicyclic geartrain does not transfer power from the input to the first output during the planetary system mode of operation.

14. The assembly of claim 13, wherein the epicyclic geartrain includes a sun gear rotatable about a centerline axis, the sun gear coupled to the input;

a ring gear circumscribing the sun gear and rotatable about the centerline axis, the ring gear coupled to the first output;

a plurality of intermediate gears arranged circumferentially about the centerline axis, each of the plurality of intermediate gears meshed between the sun gear and the ring gear; and a carrier rotatable about the centerline axis, each of the plurality of intermediate gears rotatably mounted to the carrier, and the carrier coupled to the second output.

15. The assembly of claim 13, further comprising:

a first brake configured to stop rotation of the first output during the planetary system mode of operation; and a second brake configured to stop rotation of the second output during the star system mode of operation.

* * * * *